United States Patent
Jiao (10) Patent No.: US 10,388,060 B2
(45) Date of Patent: Aug. 20, 2019

(54) SYSTEM AND METHOD FOR MULTI-VIEW RENDERING

(71) Applicant: Futurewei Technologies, Inc., Plano, TX (US)

(72) Inventor: Guofang Jiao, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 138 days.

(21) Appl. No.: 15/688,444

(22) Filed: Aug. 28, 2017

(65) Prior Publication Data

US 2019/0066360 A1 Feb. 28, 2019

(51) Int. Cl.
*G06T 15/20* (2011.01)
*G06F 3/06* (2006.01)
*G06T 15/00* (2011.01)
*H04L 1/00* (2006.01)

(52) U.S. Cl.
CPC ............ *G06T 15/205* (2013.01); *G06F 3/064* (2013.01); *G06T 15/005* (2013.01); *H04L 1/0071* (2013.01)

(58) Field of Classification Search
CPC ... G06T 15/205; G06T 15/005; H04L 1/0071; G06F 3/064
See application file for complete search history.

(56) References Cited

U.S. PATENT DOCUMENTS 5,982,384 A * 11/1999 Prouty ................... G06T 11/40
345/441
2005/0264651 A1 * 12/2005 Saishu ................. H04N 13/111
348/51

* cited by examiner

*Primary Examiner* — Phuoc Tran
(74) *Attorney, Agent, or Firm* — Slater Matsil, LLP (57) ABSTRACT

According to one aspect of the present disclosure, there is provided a method that includes: determining a block size according to capabilities of a processor; dividing a first view into a plurality of first pixel blocks having the block size and a second view into a plurality of second pixel blocks having the block size; rasterizing a primitive object to produce a subset of the first pixel blocks for the first view and a subset of the second pixel blocks for the second view; and rendering the subsets of the first and second pixel blocks produced for the primitive object to produce a first image for the first view and a second image for the second view, where the rendering is interleaved between the subsets of the first and second pixel blocks occupied by the primitive object in the first and second views.

26 Claims, 7 Drawing Sheets

100

| 106 | 104 | 106 |
|---|---|---|
| 104 | 102 | 104 |
| 106 | 104 | 106 |

SYSTEM AND METHOD FOR MULTI-VIEW RENDERING

TECHNICAL FIELD

The present invention relates generally to a system and method for rendering, and, in particular embodiments, to a system and method for multi-view rendering.

BACKGROUND

In multi-view rendering, a single geometric graph is rendered for multiple views or displays viewed by a user. The views may be from different perspectives of the graph. Multi-view rendering has applications in virtual reality, where a same geometric graph is rendered from different perspectives for each view (e.g., once perspective for each eye). Because multi-view rendering involves rendering a single scene more than once, device performance and battery life are important considerations in multi-view rendering.

SUMMARY

According to one aspect of the present disclosure, there is provided a method that includes: determining, by a processor, a block size according to capabilities of the processor; dividing, by the processor, a first view into a plurality of first pixel blocks having the block size and a second view into a plurality of second pixel blocks having the block size; rasterizing, by the processor, a primitive object to produce a subset of the first pixel blocks for the first view and a subset of the second pixel blocks for the second view, where the rasterizing is interleaved between the subsets of the first and second pixel blocks occupied by the primitive object in the first and second views; and rendering, by the processor, the subsets of the first and second pixel blocks produced for the primitive object to produce a first image for the first view and a second image for the second view, where the rendering is interleaved between the subsets of the first and second pixel blocks occupied by the primitive object in the first and second views.

Optionally, in any of the preceding aspects, another implementation of the aspect provides that the method further includes: accessing, by a processor, the primitive object, the primitive object representing an entity in three-dimensional space. Optionally, in any of the preceding aspects, another implementation of the aspect provides that the method further includes: displaying, by the processor, the first image on the first view and the second image on the second view. Optionally, in any of the preceding aspects, another implementation of the aspect provides that the rasterizing the primitive object includes: rasterizing, by the processor, the primitive object to produce first coarse blocks for the first view and second coarse blocks for the second view; and refining, by the processor, the first and second coarse blocks to produce the subset of the first pixel blocks for the first view and the subset of the second pixel blocks for the second view. Optionally, in any of the preceding aspects, another implementation of the aspect provides that the rasterizing is further interleaved between the first and second coarse blocks. Optionally, in any of the preceding aspects, another implementation of the aspect provides that the first and second coarse blocks are larger than the first and second pixel blocks. Optionally, in any of the preceding aspects, another implementation of the aspect provides that the rendering is interleaved between each of the first and second pixel blocks in the first and second views. Optionally, in any of the preceding aspects, another implementation of the aspect provides that the first pixel blocks of the first view and the second pixel blocks of the second view are alternatingly rendered, where resources used in rendering a first pixel block in the first view are cached and re-used in rendering a corresponding second pixel block in the second view. Optionally, in any of the preceding aspects, another implementation of the aspect provides that the rasterizing the primitive object is interleaved between the subsets of the first and second pixel blocks in response to the first view and the second view being the same resolution. Optionally, in any of the preceding aspects, another implementation of the aspect provides that the first view and the second view each have a first region at a same first resolution and a second region at a same second resolution. Optionally, in any of the preceding aspects, another implementation of the aspect provides that the rasterizing the primitive object is interleaved between the subsets of the first and second pixel blocks in response to the subsets of the first and second pixel blocks being in the same region of the first and second view. Optionally, in any of the preceding aspects, another implementation of the aspect provides that a first portion of the first view is rendered at a first resolution and a second portion of the first view is rendered at a second resolution. Optionally, in any of the preceding aspects, another implementation of the aspect provides that a first portion of the first view is rendered at a first resolution and at least a second portion of the first view is rendered at a second resolution, where the first and second resolutions depend on positions of the first portion and the second portion in the first view.

According to one aspect of the present disclosure, there is provided a device that includes: a processor; and a non-transitory computer readable storage medium in communication with the processor and storing programming for execution by the processor, the programming including instructions for: determining a block size according to capabilities of the processor; dividing a first view into a plurality of first pixel blocks having the block size and a second view into a plurality of second pixel blocks having the block size; rasterizing a primitive object to produce a subset of the first pixel blocks for the first view and a subset of the second pixel blocks for the second view, where the rasterizing is interleaved between the subsets of the first and second pixel blocks occupied by the primitive object in the first and second views; and rendering the subsets of the first and second pixel blocks produced for the primitive object to produce a first image for the first view and a second image for the second view, where the rendering is interleaved between the subsets of the first and second pixel blocks occupied by the primitive object in the first and second views.

Optionally, in any of the preceding aspects, another implementation of the aspect provides that the programming further includes instructions for: accessing the primitive object, the primitive object representing an entity in three-dimensional space. Optionally, in any of the preceding aspects, another implementation of the aspect provides that the programming further includes instructions for: displaying the first image on the first view and the second image on the second view. Optionally, in any of the preceding aspects, another implementation of the aspect provides that the instructions for rasterizing the primitive object include instructions for: rasterizing the primitive object to produce first coarse blocks for the first view and second coarse blocks for the second view; and refining the first and second coarse blocks to produce the subset of the first pixel blocks for the first view and the subset of the second pixel blocks for the second view. Optionally, in any of the preceding aspects, another implementation of the aspect provides that the rasterizing is further interleaved between the first and second coarse blocks. Optionally, in any of the preceding aspects, another implementation of the aspect provides that the first and second coarse blocks are larger than the first and second pixel blocks. Optionally, in any of the preceding aspects, another implementation of the aspect provides that the rendering is interleaved between each of the first and second pixel blocks in the first and second views. Optionally, in any of the preceding aspects, another implementation of the aspect provides that the first pixel blocks of the first view and the second pixel blocks of the second view are alternatingly rendered, where resources used in rendering a first pixel block in the first view are cached and re-used in rendering a corresponding second pixel block in the second view. Optionally, in any of the preceding aspects, another implementation of the aspect provides that the rasterizing the primitive object is interleaved between the subsets of the first and second pixel blocks in response to the first view and the second view being the same resolution. Optionally, in any of the preceding aspects, another implementation of the aspect provides that the first view and the second view each have a first region at a same first resolution and a second region at a same second resolution. Optionally, in any of the preceding aspects, another implementation of the aspect provides that the rasterizing the primitive object is interleaved between the subsets of the first and second pixel blocks in response to the subsets of the first and second pixel blocks being in the same region of the first and second view. Optionally, in any of the preceding aspects, another implementation of the aspect provides that a first portion of the first view is rendered at a first resolution and a second portion of the first view is rendered at a second resolution. Optionally, in any of the preceding aspects, another implementation of the aspect provides that a first portion of the first view is rendered at a first resolution and at least a second portion of the first view is rendered at a second resolution, where the first and second resolutions depend on positions of the first portion and the second portion in the first view.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

According to various embodiments, rasterizing and rendering of a primitive for a geometric graph is interleaved across multiple views. The views are divided into pixel blocks according to capabilities of a processor performing the rendering, and the interleaved rasterizing and rendering is performed at the pixel block level. The pixel blocks in each view are rendered in an alternating manner such that resources used to render a pixel block in a first view may be cached and re-used when rendering a corresponding pixel block in a second view. Cache efficiency of the processor may thereby be improved.

Figure 1:
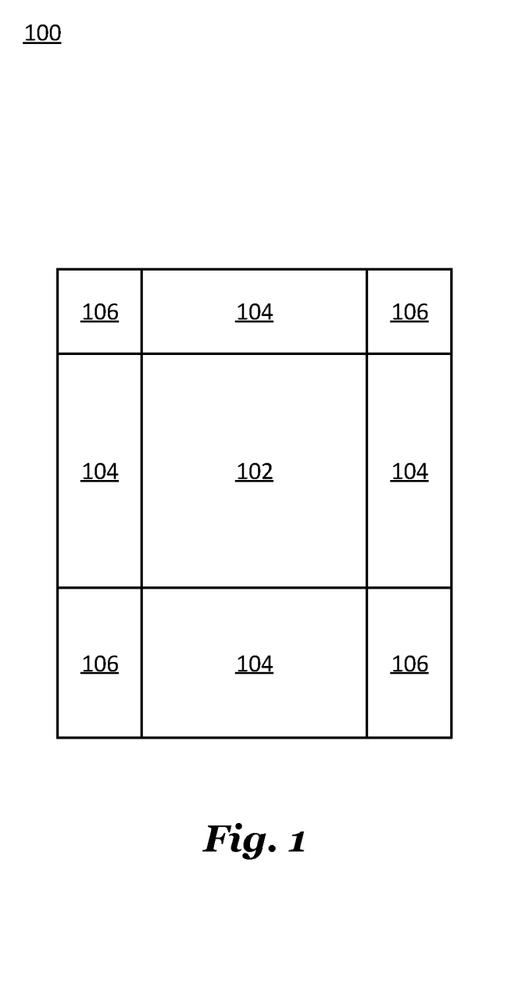
FIG. 1 is a block diagram of a view, in accordance with some embodiments.

FIG. 1 is a block diagram of a view 100, in accordance with some embodiments. The view 100 may be a display such as a computer monitor, a television, a display in a virtual reality (VR) headset, or the like. In an embodiment, the view 100 is a display for a single eye (e.g., left eye or right eye) of a VR headset, and the VR headset has two views 100 (e.g., one for each eye of the user). Because the view 100 may be very close to a user, e.g., close to the user's eye in a VR headset, the view 100 may be rendered at a high resolution. Higher resolutions allow for more detail to be seen by the user, particularly when the user is close to the view 100.

Images may be rendered for the view 100 at a single resolution, or at multiple resolutions. In some embodiments, the entirety of the view 100 may be rendered at one resolution. In other embodiments, the view 100 may be divided into several sections 102, 104, and 106. The different sections 102, 104, 106 may be rendered at different resolutions according to their position on the view 100. For example, the center section 102 may be rendered at a highest resolution, as it is most visible to a user. Likewise, edge sections 104 may be rendered at a lower resolution, they are located the periphery of a user's vision and therefore are not as visible as the center section 102. Further, corner sections 106 may be rendered at a further lower resolution, as they are located in the corners of the user's vision and therefore are even less visible than the edge sections 104. In an embodiment, the edge sections 104 are rendered at half of the resolution of the center section 102, and the corner sections 106 are rendered at one quarter of the resolution of the center section 102.

Figure 2:
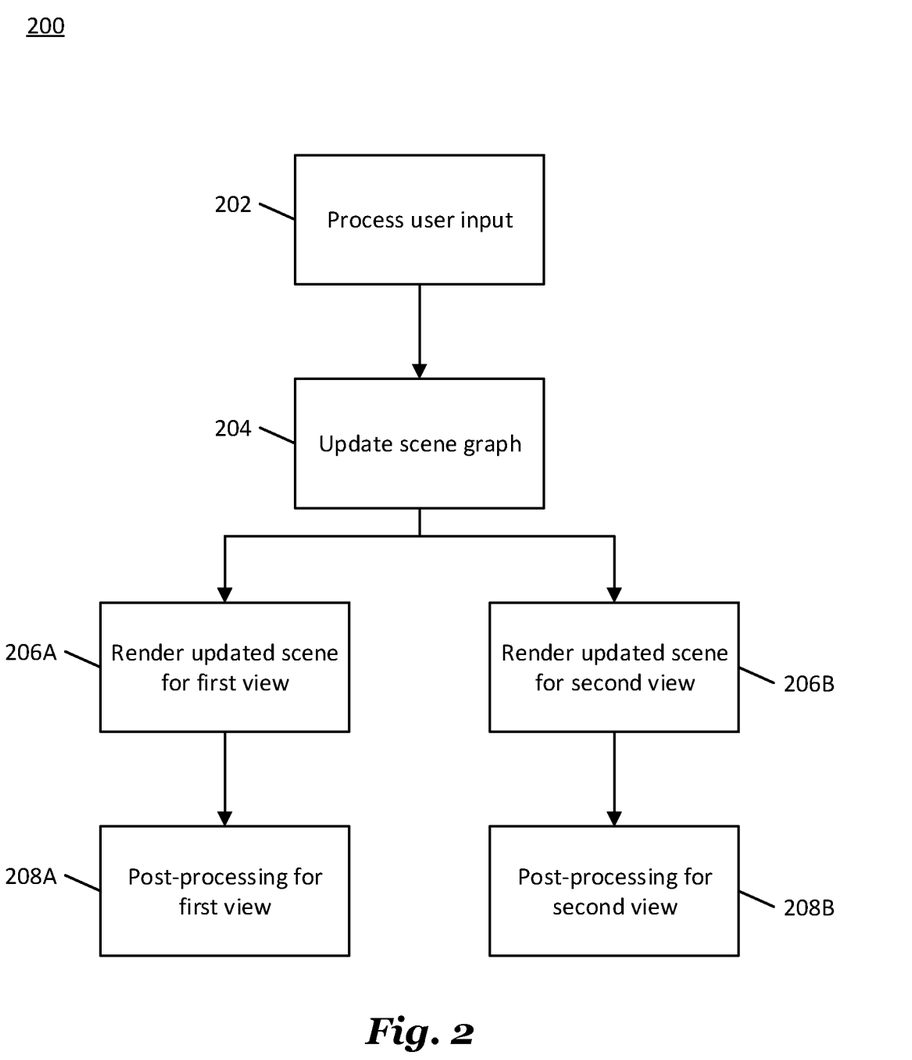
FIG. 2 is a flow diagram of a method illustrating high-level steps for rendering multiple views, in accordance with some embodiments.

FIG. 2 is a flow diagram of a method 200 illustrating high-level steps for rendering multiple views 100 for a multi-view display (such as a VR headset with two views 100), in accordance with some embodiments. The method 200 is performed by a processor, which may be a general-purpose central processing unit (CPU), a graphics processing unit (GPU), and application-specific integrated circuit (ASIC), or the like. User inputs, such as input from controller, keyboards, touch sensors, and the like, are processed (step 202). The user input is used to update a screen graph (step 204). The screen graph may be a geometric representation of the view 100. For example, the screen graph may include primitive objects (or "primitives") such as polygons, lines, and points that will be rasterized and rendered for the view 100. The geometry may be represented in a format that is compatible with a 2D or 3D vector graphics application programming interface (API), such as the Open Graphics Library (OpenGL®), Direct3D®, or the like. The updated scene graph is rendered for the views 100 (step 206). As noted above, there may be two views 100, and so the updated scene is rendered for a first of the views (step 206A), such as the left eye view, and for a second of the views (step 206B), such as the right eye. The rendered scene is then post-processed and displayed in each view (step 208). Post-processing and displaying is performed for the first of the views (step 208A), and the second of the views (step 208B). Rendering both views from the same screen graph geometry allows rendering to be performed in a single pass, thereby reducing the rendering workload.

A large primitive, such as a large polygon (e.g., triangle), may be rendered to both the first and second views 100. Further, large primitive may be rendered to the first and second views 100 at the same resolution. For example, a large polygon in the distance of a scene may be rendered in the center section 102 of both the first view 100 (e.g., the left eye) and the second view 100 (e.g., the right eye). In such situations, the resources associated with that polygon may be used for rendering both the first and second views 100. Examples of such resources include textures, shaders, buffers, and the like.

Resources may be stored on non-volatile storage (such as a hard disk drive or solid-state disk), and moved into volatile memory (such as random access memory (RAM)) for use during rendering. During rendering, such resources may be accessed from the volatile or non-volatile storage and may be cached in one or more high-speed caches of the processor. Such caches are hardware caches located closer to the processor core than the memory, and store copies of instructions and/or data from frequently used main memory locations. Examples of such caches include Level 1 (L1) cache, Level 2 (L2) cache, Level 3 (L3) cache, or the like. When rendering the first and second views 100, resources may be used stored in and used from the processor caches. Rendering the scene graph separately for the first and second views 100 may reduce the amount of processor cache hits. For example, resources used in rendering a polygon in the first view 100 may also be needed for rendering the second view 100, but may be removed from the processor cache by the time rendering of the first view 100 is complete.

Figure 3:
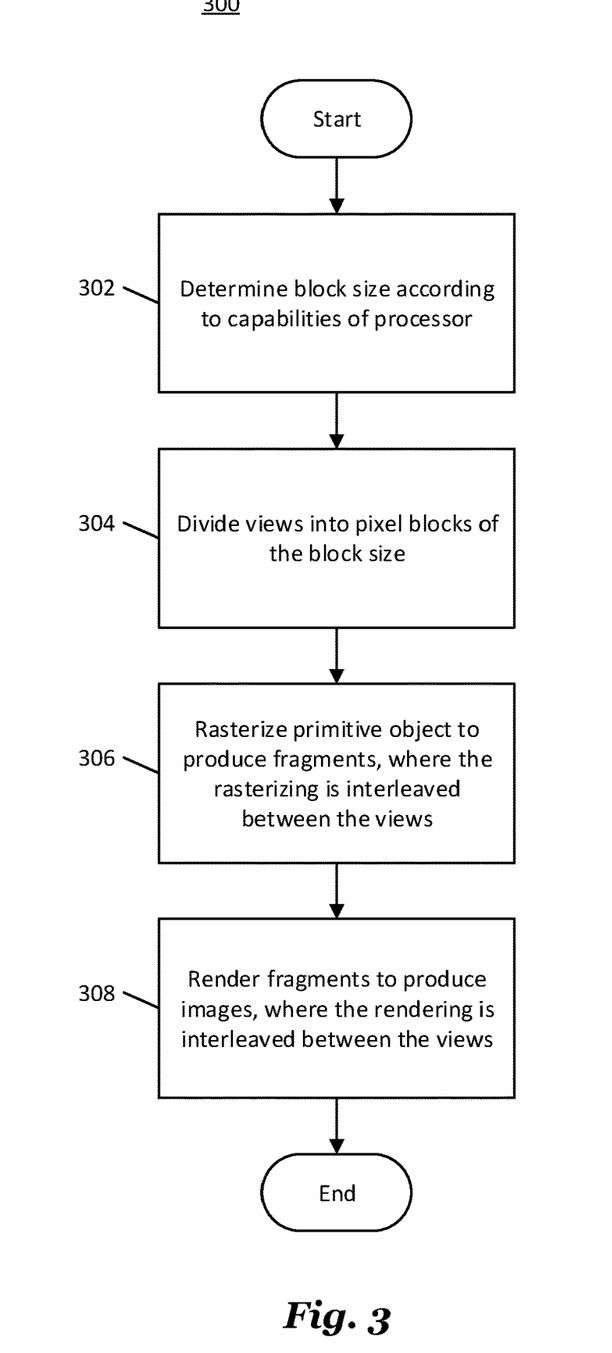
FIG. 3 is a flow diagram illustrating a method for performing interleaved rasterizing and rendering of a primitive, in accordance with some embodiments.
Figure 4A:
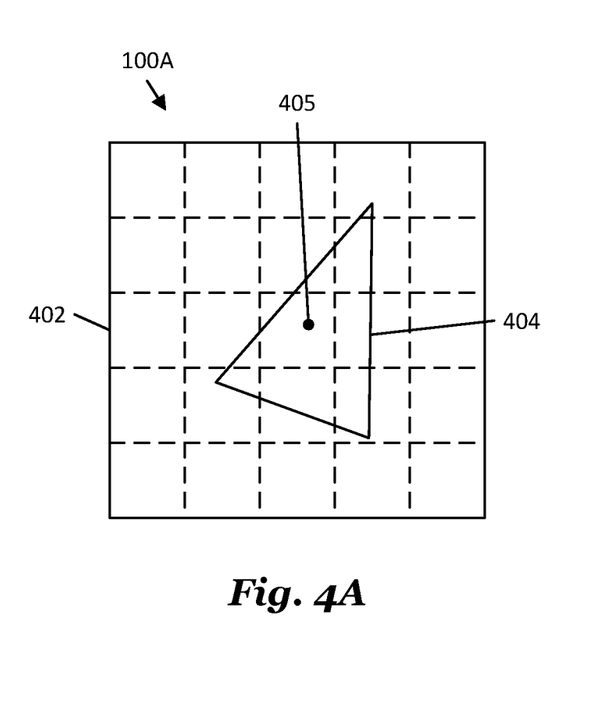
FIGS. 4A and 4B are simplified diagrams illustrating views during rendering, in accordance with some embodiments.
Figure 4B:
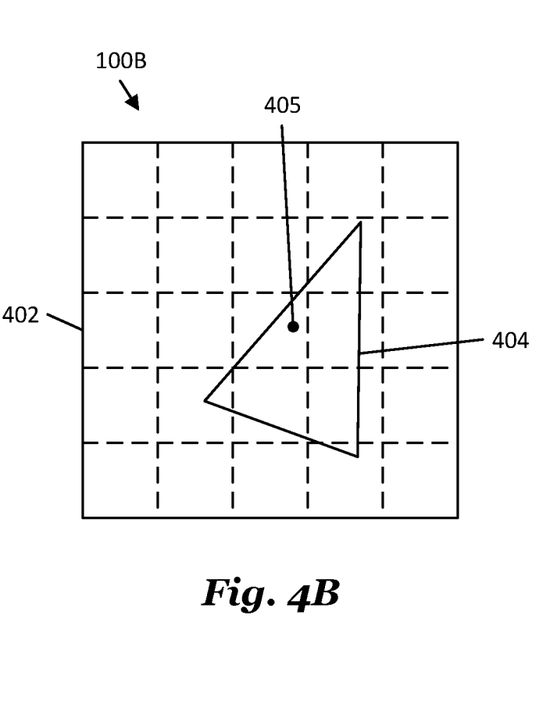

FIG. 3 is a flow diagram illustrating a method 300 for performing interleaved rasterizing and rendering of a primitive, in accordance with some embodiments. The method 300 is performed by a processor. The primitive is an object from a higher-level geometric scene, which may be produced by software, and accessed by the processor. Interleaving the rasterizing and rendering of the primitive for the first and second views 100 may allow for more efficient use of the processor cache. FIGS. 4A and 4B are simplified diagrams illustrating the views 100 during the method 300, in accordance with some embodiments. FIG. 4A illustrates rendering of a primitive 404 for a first view 100A (e.g., for the left eye), and FIG. 4B illustrates rendering of the primitive 404 for a second view 100B (e.g., for the right eye).

A block size is determined according to the capabilities of the processor (step 302). The capabilities of the processor may include the sizes of caches on the processor, the quantity of the caches, the levels of the caches, and the like. The block size may (or may not) be square, and may be a size such as 8×8 pixels, 16×16 pixels, 32×32 pixels, or the like.

The views 100 are divided into a plurality of pixel blocks 402 having the block size (step 304). In particular, the first view 100A is divided into a plurality of first pixel blocks 402 having the block size, and the second view 100B is divided into a plurality of second pixel blocks 402 having the block size.

The primitive 404 is rasterized to produce corresponding fragments 405, and the rasterizing is interleaved between the views (step 306). In particular, rasterizing the primitive produces a plurality of first fragments 405 for the first view 100A and a plurality of second fragments 405 for the second view 100B. A fragment is a pixel value having additional attributes, such as color, texture, or the like; each fragment represent a sample-sized segment of a rasterized primitive. Each of the pixel blocks 402 occupied by the rasterized primitive 404 includes a subset of the plurality of fragments 405. The primitive 404 occupies a subset of the first pixel blocks 402 in the first view 100A, and a subset of the second pixel blocks 402 in the second view 100B.

The rasterizing of the primitive is interleaved between the subsets of the first and second pixel blocks 402 occupied by the primitive 404. As discussed above, the primitive 404 occupies several pixel blocks 402 in each view 100. The pixel blocks 402 may be referred to by indices along the X and Y axes. For example, a block B[i, j] may refer to a pixel block 402 at X-axis index i, and at Y-axis index j. The rasterizing may begin at block B[0,0], and the i and j indices are increased to their maximum value such that all blocks B[i, j] are rasterized. The rasterizing is interleaved such that each of the blocks B[i, j] occupied by the primitive 404 are rasterized in the views 100 in an alternating manner. For example, the block B[3,3] in the first view 100A may be rasterized, and the block B [3,3] in the second view 100B may then be rasterized. Next, the block B[3,4] in the first view 100A may be rasterized, and the block B [3,4] in the second view 100B may then be rasterized. Blocks not occupied by the primitive 404 are skipped. For example, if the block B[3,0] in the first view 100A is occupied by the primitive 404, it is rasterized; the block B[3,0] in the second view 100B is checked, and is skipped if it is not occupied by the primitive.

In some embodiments (discussed below), rasterizing may be hierarchical. In such embodiments, rasterizing may be performed in several stages, where larger block sizes are used for the earlier stages, and smaller block sizes are used for the later stages.

The fragments 405 are rendered to produce images for the views 100, and the rendering is interleaved between the views (step 308). In particular, the first fragments 405 are rendered to produce a first image for the first view 100A, and the second fragments 405 are rendered to produce a second image for the second view 100B. Rendering the fragments 405 includes texturing and shading the fragments 405 and combining them with the existing frame buffer for each view 100. Like the rasterization, the rendering is interleaved such that the fragments 405 in each of the blocks B[i, j] occupied by the primitive 404 are rendered in the views 100 in an alternating manner. By interleaving the rendering of the primitive 404 for each pixel block 402 across the views 100 (e.g., interleaving rendering of the fragments 405 in each of the pixel block 402 occupied by the primitive 404), more processor cache hits may be achieved for resources used in rendering the primitive 404. For example, a shader used to render the fragments 405 in block B[i, j] of the primitive 404 in the first view 100A may be re-used from the processor cache (e.g., L2 or L3 cache) when rendering the fragments 405 in block B[i, j] of the primitive 404 in the second view 100B. Once the primitive 404 is rendered, the produced images may be displayed on the views 100.

In some embodiments, the rasterizing and/or rendering may only be interleaved in response to the primitive being rasterized and rendered at the same resolution in each of the views 100. In other words, rasterizing and/or rendering may only be interleaved when the primitive occupies the same regions of the views 100.

Figure 5:
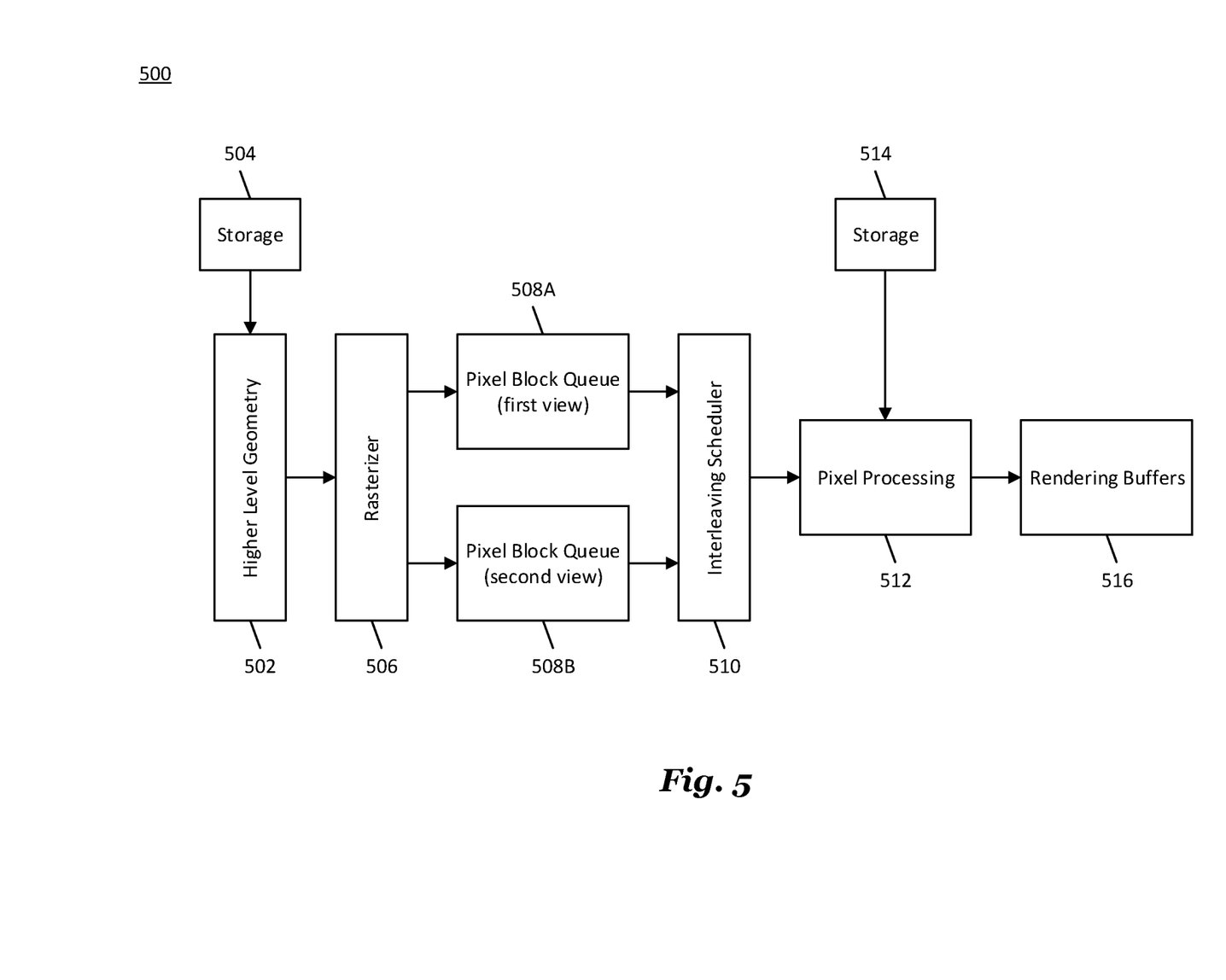
FIG. 5 is a block diagram illustrating a rendering pipeline, in accordance with some embodiments.

FIG. 5 is a block diagram illustrating a rendering pipeline 500, in accordance with some embodiments. The rendering pipeline 500 is a conceptual model of some steps undertaken when performing the method 300.

Higher-level geometry 502 produces the primitives. The primitives may be produced according to user input, and may be produced according to resources stored in storage 504. The storage 504 may be volatile or non-volatile storage. For example, the higher-level geometry 502 may be a front part of a rendering engine of a video game, a virtual reality device, or the like.

A rasterizer 506 rasterizes the primitives 404 from the higher-level geometry 502 to produce the pixel blocks 402 (e.g., to rasterize the primitives 404 in the pixel blocks 402). The blocks of the views 100 occupied by the primitives 404 are stored in pixel block queues 508. The pixel block queues 508 include a first pixel block queue 508A for the first view 100A, and a second pixel block queue 508B for the second view 100B. The rasterizer 506 rasterizes the primitives for each view 100, and produces pixel blocks that are stored in the pixel block queues 508 in an alternating manner.

The pixel block queues 508 are input to an interleaving scheduler 510 in a balanced manner. The interleaving scheduler 510 provides blocks from the pixel block queues 508 to the pixel processing pipelines 512 in an alternating manner, to achieve the interleaved rendering discussed above. The pixel processing pipelines 512 may perform functionality such as pixel interpolation, pixel shading, depth processing, color processing, and the like. The pixel processing pipelines 512 use the resources (e.g., textures, shaders, buffers, etc.), which may be cached in L1/L2/L3 cache, to compute the color values of pixels displayed on the views 100. The resources are stored in storage 514, which may be volatile or non-volatile storage, or may be the cache of the processor. The color values of the pixels are stored in rendering buffers 516 for the views 100. The rendering buffers 516 may be, e.g., memory. The rendering buffers 516 are then output to displays, such as a VR headset, computer monitors, televisions, or the like.

Figure 6:
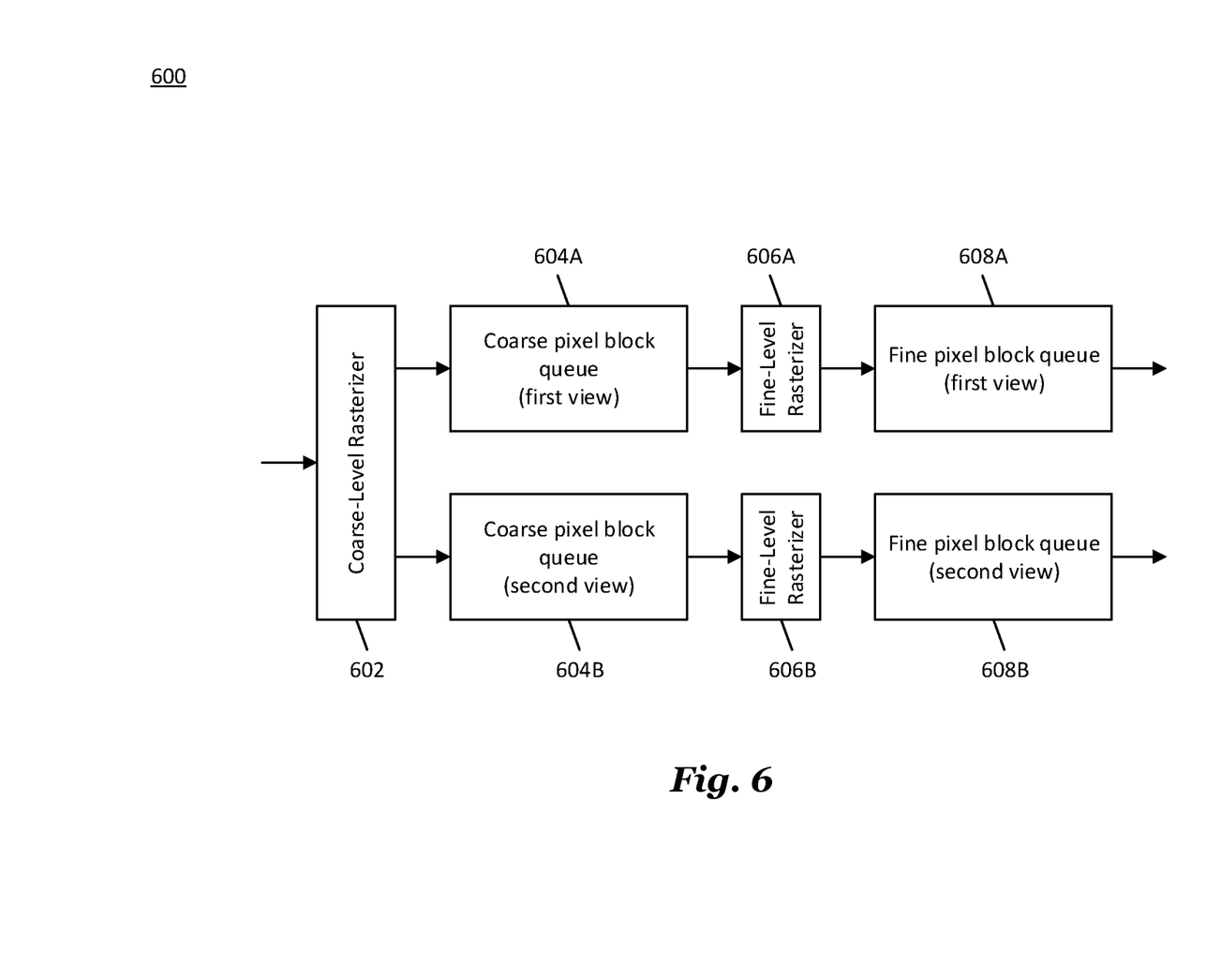
FIG. 6 is a block diagram illustrating a rasterizing pipeline, in accordance with some embodiments.

FIG. 6 is a block diagram illustrating a rasterizing pipeline 600, in accordance with some embodiments. The rasterizing pipeline 600 is a conceptual model of steps undertaken when performing hierarchical rasterization in step 306 of the method 300, and may be performed by the rasterizer 506 of the rendering pipeline 500. Hierarchical rasterization may be used for very large primitives (e.g., primitives that span many pixel blocks and may lengthen the pixel block queues 508 during rasterized). Hierarchical rasterization includes rasterizing the primitives to produce large pixel blocks, and then refining the large pixel blocks to produce small pixel blocks having the block size determined in step 302. Hierarchical rasterization may reduce the amount of memory consumed by pixel block queues when rasterizing a large primitive.

A coarse-level rasterizer 602 receives the primitives from the higher-level geometry 502. The coarse-level rasterizer 602 generates coarse pixel blocks for the primitive, and stores the coarse pixel blocks in coarse pixel block queues 604. The coarse pixel block queues 604 include a first coarse pixel block queue 604A for the first view 100A, and a second coarse pixel block queue 604B for the second view 100B.

The coarse pixel blocks may be one or more integer multiples of the size of the pixel blocks 402. For example, when the pixel blocks 402 are 8×8 pixels, the coarse pixel blocks may be 64×64 pixels or larger (a size multiple of eight). The coarse-level rasterizer 602 produces the coarse pixel blocks in an interleaved manner. In some embodiments, rasterizing for the views 100 may be performed one coarse pixel block for each view 100 at a time. In some embodiment, rasterizing for the views 100 may be performed several pixel blocks for each view 100 at a time.

Fine-level rasterizers 606A/606B receive the coarse pixel blocks from each of the coarse pixel block queues 604A/604B. The coarse pixel blocks are each refined to produce a plurality of fine pixel blocks from each coarse pixel block. The fine pixel blocks are the size of the pixel blocks 402, and are stored in fine pixel block queues 608. The fine pixel block queues 608 include a first fine pixel block queue 608A for the first view 100A, and a second fine pixel block queue 608B for the second view 100B. The fine pixel block queues 608 are input to the interleaving scheduler 510.

Although the rasterizing pipeline 600 illustrates two levels of rasterization (one coarse and one fine), it should be appreciated that any quantity of hierarchical rasterizing levels could be used. For example, in direct render GPU architectures, 3 to 4 levels of rasterization could be performed. Likewise, in deferred tile-based rendering GPU architectures, 2 levels of rasterization could be performed.

Embodiments may achieve advantages. By interleaving the rendering of primitives at a block level, the efficiency of processor caches may be increased and memory utilization may be decreased. Power consumption may thereby be reduced. Interleaving the rasterization of primitives may allow interleaving of rendering. Rasterizing the primitives with a hierarchical scheme may further reduce the memory used by decreasing the length of pixel block queues.

Figure 7:
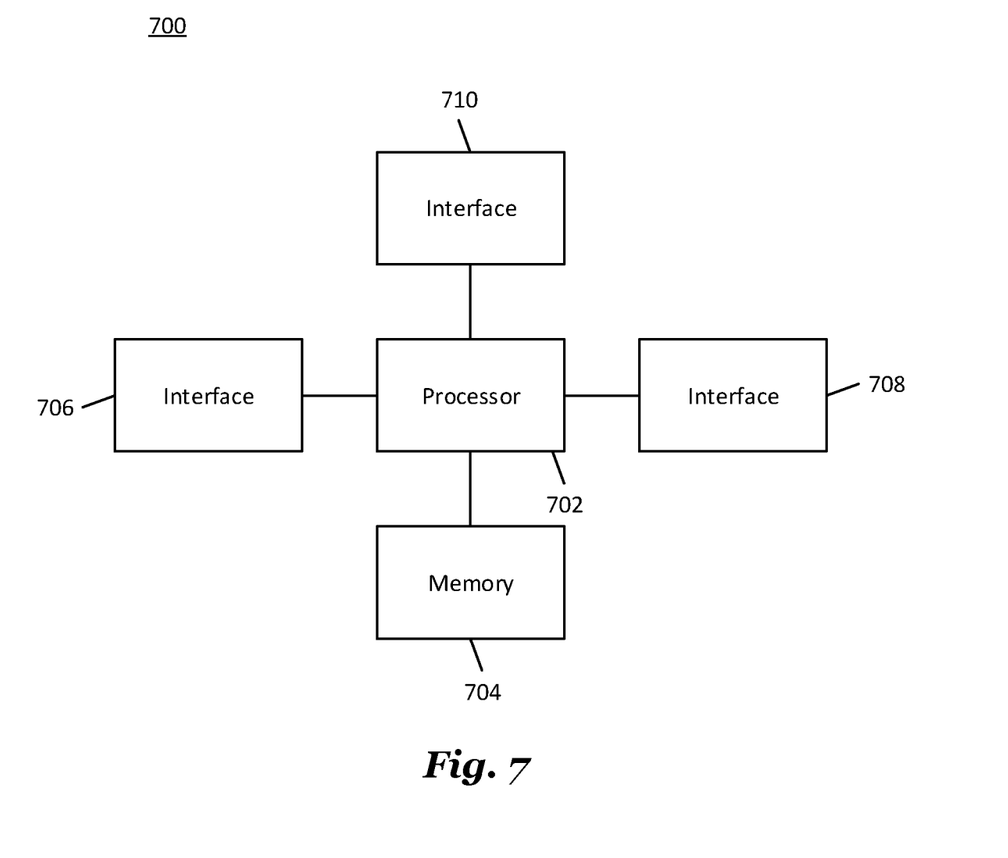
FIG. 7 is a block diagram of a processing system.

FIG. 7 is a block diagram of a processing system 700 for performing methods described herein, which may be installed in a host device. As shown, the processing system 700 includes a processor 702, a memory 704, and interfaces 706-710, which may (or may not) be arranged as shown in FIG. 7. The processor 702 may be any component or collection of components adapted to perform computations and/or other processing related tasks. The memory 704 may be any component or collection of components adapted to store programming and/or instructions for execution by the processor 702. In an embodiment, the memory 704 includes a non-transitory computer readable medium. The interfaces 706, 708, 710 may be any component or collection of components that allow the processing system 700 to communicate with other devices/components and/or a user. For example, one or more of the interfaces 706, 708, 710 may be adapted to communicate data, control, or management messages from the processor 702 to applications installed on the host device and/or a remote device. As another example, one or more of the interfaces 706, 708, 710 may be adapted to allow a user or user device (e.g., personal computer (PC), etc.) to interact/communicate with the processing system 700. The processing system 700 may include additional components not depicted in FIG. 7, such as long term storage (e.g., non-volatile memory, etc.).

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module, a dividing unit/module, a rasterizing unit/module, a rendering unit/module, an accessing unit/module, a displaying unit/module, and/or a refining unit/module. The respective units/modules may be hardware, software, or a combination thereof. For instance, one or more of the units/modules may be an integrated circuit, such as field programmable gate arrays (FPGAs) or application-specific integrated circuits (ASICs).

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
    determining, by a processor, a block size according to capabilities of the processor;
    dividing, by the processor, a first view into a plurality of first pixel blocks having the block size and a second view into a plurality of second pixel blocks having the block size;
    rasterizing, by the processor, a primitive object to produce a subset of the first pixel blocks for the first view and a subset of the second pixel blocks for the second view, wherein the rasterizing is interleaved between the subsets of the first and second pixel blocks occupied by the primitive object in the first and second views; and
    rendering, by the processor, the subsets of the first and second pixel blocks produced for the primitive object to produce a first image for the first view and a second image for the second view, wherein the rendering is interleaved between the subsets of the first and second pixel blocks occupied by the primitive object in the first and second views.

2. The method of claim 1, further comprising:
    accessing, by a processor, the primitive object, the primitive object representing an entity in three-dimensional space.

3. The method of claim 1, further comprising:
    displaying, by the processor, the first image on the first view and the second image on the second view.

4. The method of claim 1, wherein the rasterizing the primitive object comprises:
    rasterizing, by the processor, the primitive object to produce first coarse blocks for the first view and second coarse blocks for the second view; and
    refining, by the processor, the first and second coarse blocks to produce the subset of the first pixel blocks for the first view and the subset of the second pixel blocks for the second view.

5. The method of claim 4, wherein the rasterizing is further interleaved between the first and second coarse blocks.

6. The method of claim 4, wherein the first and second coarse blocks are larger than the first and second pixel blocks.

7. The method of claim 1, wherein the rendering is interleaved between each of the first and second pixel blocks in the first and second views.

8. The method of claim 1, wherein the first pixel blocks of the first view and the second pixel blocks of the second view are alternatingly rendered, wherein resources used in rendering a first pixel block in the first view are cached and re-used in rendering a corresponding second pixel block in the second view.

9. The method of claim 1, wherein the rasterizing the primitive object is interleaved between the subsets of the first and second pixel blocks in response to the first view and the second view being the same resolution.

10. The method of claim 1, wherein the first view and the second view each have a first region at a same first resolution and a second region at a same second resolution.

11. The method of claim 10, wherein the rasterizing the primitive object is interleaved between the subsets of the first and second pixel blocks in response to the subsets of the first and second pixel blocks being in the same region of the first and second view.

12. The method of claim 1, wherein a first portion of the first view is rendered at a first resolution and a second portion of the first view is rendered at a second resolution.

13. The method of claim 1, wherein a first portion of the first view is rendered at a first resolution and at least a second portion of the first view is rendered at a second resolution, wherein the first and second resolutions depend on positions of the first portion and the second portion in the first view.

14. A device comprising:
    a processor; and
    a non-transitory computer readable storage medium in communication with the processor and storing programming for execution by the processor, the programming including instructions for:
        determining a block size according to capabilities of the processor;
        dividing a first view into a plurality of first pixel blocks having the block size and a second view into a plurality of second pixel blocks having the block size;

rasterizing a primitive object to produce a subset of the first pixel blocks for the first view and a subset of the second pixel blocks for the second view, wherein the rasterizing is interleaved between the subsets of the first and second pixel blocks occupied by the primitive object in the first and second views; and rendering the subsets of the first and second pixel blocks produced for the primitive object to produce a first image for the first view and a second image for the second view, wherein the rendering is interleaved between the subsets of the first and second pixel blocks occupied by the primitive object in the first and second views.

15. The device of claim 14, wherein the programming further includes instructions for:

accessing the primitive object, the primitive object representing an entity in three-dimensional space.

16. The device of claim 14, wherein the programming further includes instructions for:

displaying the first image on the first view and the second image on the second view.

17. The device of claim 14, wherein the instructions for rasterizing the primitive object comprise instructions for:

rasterizing the primitive object to produce first coarse blocks for the first view and second coarse blocks for the second view; and refining the first and second coarse blocks to produce the subset of the first pixel blocks for the first view and the subset of the second pixel blocks for the second view.

18. The device of claim 17, wherein the rasterizing is further interleaved between the first and second coarse blocks.

19. The device of claim 17, wherein the first and second coarse blocks are larger than the first and second pixel blocks.

20. The device of claim 14, wherein the rendering is interleaved between each of the first and second pixel blocks in the first and second views.

21. The device of claim 14, wherein the first pixel blocks of the first view and the second pixel blocks of the second view are alternatingly rendered, wherein resources used in rendering a first pixel block in the first view are cached and re-used in rendering a corresponding second pixel block in the second view.

22. The device of claim 14, wherein the rasterizing the primitive object is interleaved between the subsets of the first and second pixel blocks in response to the first view and the second view being the same resolution.

23. The device of claim 14, wherein the first view and the second view each have a first region at a same first resolution and a second region at a same second resolution.

24. The device of claim 23, wherein the rasterizing the primitive object is interleaved between the subsets of the first and second pixel blocks in response to the subsets of the first and second pixel blocks being in the same region of the first and second view.

25. The device of claim 23, wherein a first portion of the first view is rendered at a first resolution and a second portion of the first view is rendered at a second resolution.

26. The device of claim 23, wherein a first portion of the first view is rendered at a first resolution and at least a second portion of the first view is rendered at a second resolution, wherein the first and second resolutions depend on positions of the first portion and the second portion in the first view.

* * * * *